(12) United States Patent
Chakraborty et al.

(10) Patent No.: US 10,887,336 B2
(45) Date of Patent: ***Jan. 5, 2021

(54) ROOT CAUSE ANALYSIS IN DYNAMIC SOFTWARE TESTING VIA PROBABILISTIC MODELING

(71) Applicant: International Business Machines Corporation, Armonk, NY (US)

(72) Inventors: Supriyo Chakraborty, White Plains, NY (US); Omer Tripp, Bronx, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/543,044

(22) Filed: Aug. 16, 2019

(65) Prior Publication Data

US 2019/0373010 A1 Dec. 5, 2019

Related U.S. Application Data

(63) Continuation of application No. 15/204,762, filed on Jul. 7, 2016, now Pat. No. 10,404,734.

(51) Int. Cl.
*G06F 21/00* (2013.01)
*H04L 29/06* (2006.01)
(Continued)

(52) U.S. Cl.
CPC ...... *H04L 63/1433* (2013.01); *G06F 11/3676* (2013.01); *G06F 11/3684* (2013.01); *G06N 7/005* (2013.01)

(58) Field of Classification Search
None
See application file for complete search history.

(56) References Cited

U.S. PATENT DOCUMENTS

| 7,213,047 | B2 | 5/2007 | Yeager et al. |
| 7,315,805 | B2 * | 1/2008 | Slater ...................... G06F 30/20 703/19 |

(Continued)

OTHER PUBLICATIONS

Non-Final Office Action received for U.S. Appl. No. 15/204,762 dated Jun. 8, 2018, 38 pages.

(Continued)

*Primary Examiner* — Maung T Lwin
(74) *Attorney, Agent, or Firm* — Amin, Turocy & Watson, LLP

(57) ABSTRACT

Techniques for performing root cause analysis in dynamic software testing via probabilistic modeling are provided. In one example, a computer-implemented method comprises initializing, by a system operatively coupled to a processor, a threshold value, a defined probability value, and a counter value. The computer-implemented method also includes, in response to determining, by the system, that a probability value assigned to a candidate payload of one or more candidate payloads exceeds the defined probability value, and in response to determining, by the system, that the counter value exceeds the threshold value: determining, by the system, that a match exists between the candidate payload and an input point based on an application of the candidate payload to the input point resulting in a defined condition, wherein the one or more candidate payloads are represented by population data accessed by the system.

20 Claims, 11 Drawing Sheets

(51) Int. Cl.
*G06N 7/00* (2006.01)
*G06F 11/36* (2006.01)

(56) References Cited

U.S. PATENT DOCUMENTS

| | | | |
|---|---|---|---|
| 7,487,544 | B2 | 2/2009 | Schultz et al. |
| 7,610,487 | B2 | 10/2009 | Aura et al. |
| 7,788,536 | B1 | 8/2010 | Qureshi et al. |
| 8,001,527 | B1 | 8/2011 | Qureshi et al. |
| 8,132,250 | B2 | 3/2012 | Judge et al. |
| 8,180,724 | B1 * | 5/2012 | Qureshi ............... G06F 11/079 706/50 |
| 8,321,941 | B2 | 11/2012 | Tuvell et al. |
| 8,644,342 | B2 | 2/2014 | Stolfo et al. |
| 8,812,482 | B1 | 8/2014 | Kapoor et al. |
| 9,007,929 | B2 | 4/2015 | Duchenay et al. |
| 2009/0171707 | A1 | 7/2009 | Bobak et al. |
| 2010/0054278 | A1 | 3/2010 | Stolfo et al. |
| 2012/0005534 | A1 | 1/2012 | Li et al. |
| 2012/0023566 | A1 | 1/2012 | Waterson et al. |
| 2014/0187427 | A1 * | 7/2014 | Macready ............... G06N 5/02 505/170 |
| 2014/0250045 | A1 | 9/2014 | Bounouane et al. |
| 2015/0095888 | A1 | 4/2015 | Tripp |
| 2015/0355935 | A1 | 12/2015 | Ozaki et al. |
| 2016/0275399 | A1 | 9/2016 | Leonard et al. |
| 2016/0283304 | A1 | 9/2016 | Horikawa et al. |

OTHER PUBLICATIONS

Final Office Action received for U.S. Appl. No. 15/204,762 dated Nov. 1, 2018, 21 pages.

Notice of Allowance received for U.S. Appl. No. 15/204,762 dated Feb. 21, 2019, 38 pages.

Notice of Allowance received for U.S. Appl. No. 15/204,762 dated Apr. 19, 2019, 36 pages.

IP.com, "Intelligent root-cause and defect analysis", An IP.com Prior Art Database Technical Disclosure, IP.com No. IPCOM000243596D, Oct. 5, 2015, 4 pages.

IP.com, "Dynamic Error Classification Using Machine Learning Methods", An IP.com Prior Art Database Technical Disclosure, IP.com No. IPCOM000209740D, Aug. 12, 2011, 3 pages.

IP.com, "System, Method and Apparatus for effective dynamic testing of model based applications", An IP.com Prior Art Database Technical Disclosure, IP.com No. PCOM000215790D, Mar. 12, 2012, 3 pages.

Demott et al., "Systematic bug finding and fault localization enhanced with input data tracking", Computers & Security, vol. 32, 2013, pp. 130-157.

"Manage application security risks to help protect your organization's critical data", IBM, Jan. 2016, 8 pages.

Tripp et al., "Hybrid Security Analysis of Web JavaScript Code via Dynamic Partial Evaluation", ISSTA, 2014, 11 pages.

Tripp et al., "Finding your way in the testing jungle: a learning approach to web security testing", ISSTA, Proceedings of the 2013 International Symposium on Software Testing and Analysis, 2013, 2 pages.

www.ibm.com, "IBM Security AppScan Standard", URL: https://www.ibm.com/us-en/marketplace/appscan-standard, retrieved on Mar. 14, 2019, 9 pages.

List of IBM Patents or Applications Treated as Related, as of Nov. 11, 2019.

* cited by examiner

ROOT CAUSE ANALYSIS IN DYNAMIC SOFTWARE TESTING VIA PROBABILISTIC MODELING

BACKGROUND

The subject disclosure relates to performing root cause analysis in dynamic software testing via probabilistic modeling.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate performing root cause analysis in dynamic software testing via probabilistic modeling are described.

According to an embodiment, a computer-implemented method can comprise initializing, by a system operatively coupled to a processor, a threshold value, a defined probability value, and a counter value. The computer-implemented method can also include in response to determining, by the system, that a probability value assigned to a candidate payload of one or more candidate payloads exceeds the defined probability value, and in response to determining, by the system, that the counter value exceeds the threshold value: determining, by the system, that a match exists between the candidate payload and an input point based on an application of the candidate payload to the input point resulting in a defined condition (e.g., a software security vulnerability). The one or more candidate payloads are represented by population data accessed by the system. As used herein, an input point is a location in software where the software requests input data to be provided.

According to another embodiment, a device is provided. The device comprises a determination component of a test engine that can determine that a transition probability value representing a transition probability assigned to a candidate payload exceeds a defined probability value. The determination component of the test engine can also determine that a counter value exceeds a defined threshold value. The application component of the test engine can apply the candidate payload to an input point. The test engine can report a defined condition based on receiving a result that application of the candidate payload to the input point returned a defined condition associated with a software security vulnerability.

DETAILED DESCRIPTION

Figure 1:
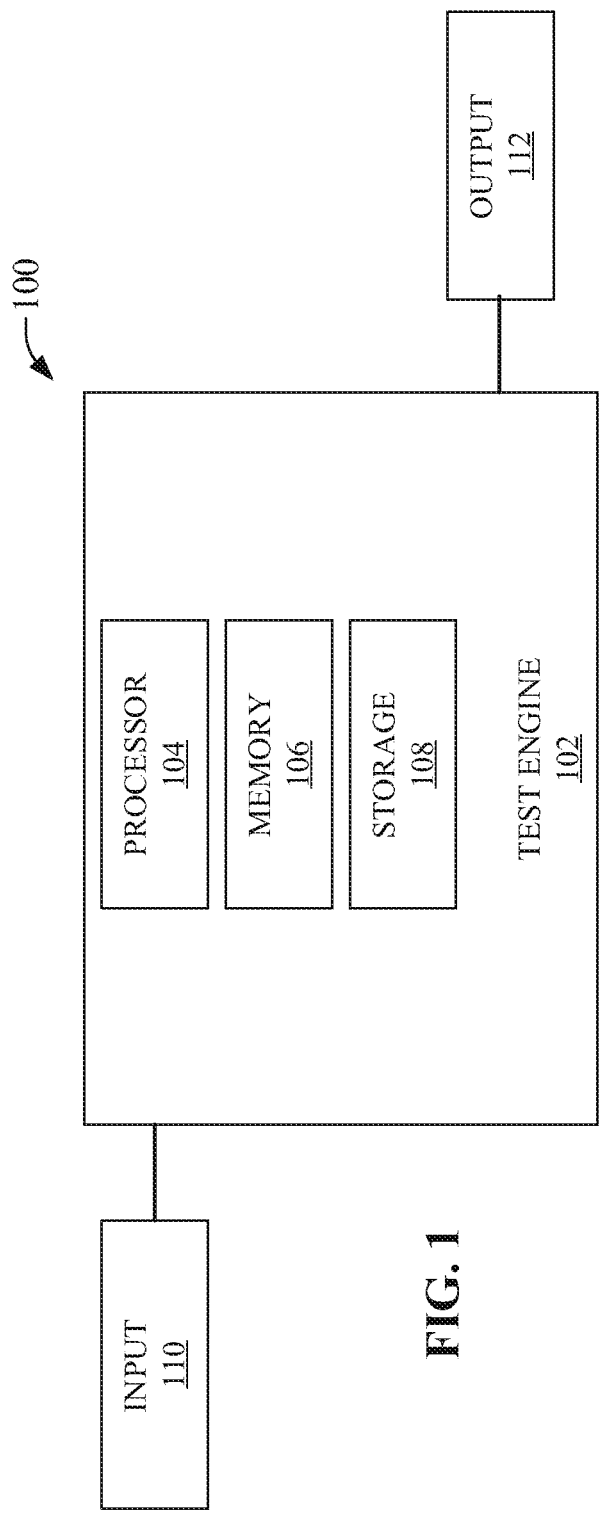
FIG. 1 illustrates a block diagram of an example, non-limiting system that facilitates performing root cause analysis in dynamic software testing via probabilistic modeling in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

One or more embodiments of the subject disclosure describes facilitating improvement of software testing tools by reducing or eliminating the use of test payloads by employing probabilistic models. Moreover, one or more embodiments of the subject disclosure improves testing processes by reducing or eliminating redundant test payloads.

Software testing presents a general paradox regarding performance versus coverage tradeoff. In particular, typically, the more thorough or extensive the testing on software to identify and rectify software security vulnerabilities, the better the coverage in regard to the extent of the vulnerabilities identified and rectified, but the more cumbersome and worse the performance of the software in regard to memory and processing resources used. Identified software security vulnerabilities can be remedied prior to release of the software for sale to and use by an end user or commercial entity.

Software that meets industry recognized standards can define countless thousands of input points (e.g., points in software where a request is made for the supply of input data). The input data can include, but is not limited to, a name, a date of birth, a credit card number, a social security number, etc. An example input point into software can include, but is not limited to, an input point into a web page where the web page requests, for example, entry of a discount coupon code. Dubious data can be provided at input points and can result in software security vulnerabilities. For example, data can be incorporated via cookie attribute, session attribute, explicit input parameters, user input originating from hypertext markup language (HTML) forms that have certain attributes assigned, such as name, address, etc. For instance, in an example embodiment, a software security vulnerability can be introduced via cookie attribute, such as the secure flag. As an example, a web server can set a cookie with a secure attribute, yet the cookie can be intercepted, when sent to a user (e.g., an attack in which the attacker secretly relays and alters the communication between two parties who believe they are directly communicating with each other). Further, in another example, a software security vulnerability can be introduced via explicit put parameters (e.g., a user inputs invalid data into a presented input field causing software security vulnerabilities to occur or become evident).

The subject disclosure is directed to computer processing systems, computer-implemented methods, apparatus and/or computer program products that facilitate efficiently and automatically (e.g., without direct human involvement) performing root cause analysis in dynamic software testing via probabilistic modeling. Humans are also unable to perform the embodiments described here as they include, and are not limited to, performing complex Markov processes, evaluating electronic information indicative of candidate payloads, determining whether countless multitudes of probability values assigned to candidate payloads exceed defined probability values, determining that counter values exceed threshold values, applying candidate payloads to input points in software, determining that an application of the candidate payloads to input points in software under test results in defined conditions, transmitting reports over wireless or wired channels, generating information for reporting the defined condition, etc. In particular, performing root cause analysis in dynamic software testing via probabilistic modeling can entail testing countless millions upon millions of different combinations and permutation of payloads that, if applied to an input point, can generate a defined condition that can indicate a software security vulnerability (e.g., buffer overruns, code injection, format string attacks, etc.). As used herein, the term "payload" means a string of values.

One or more aspects of the subject disclosure is directed to computer processing systems, computer-implemented methods, apparatus and/or computer program products that facilitate efficiently, effectively, and automatically (e.g., without direct human involvement) determining that a probability value assigned to a candidate payload exceeds a defined probability value, determining that a counter value exceeds a threshold value, determining that a match exists between the candidate payload and an input point based on an application of the candidate payload to the input point resulting in a defined condition (e.g., software vulnerability), and reporting the defined condition. The computer processing systems, computer-implemented methods, apparatus and/or computer program products employ hardware and/or software to solve problems that are highly technical in nature. For example, problems are related to automated processing, detection and reporting of software security vulnerabilities. These problems are not abstract and cannot be performed as a set of mental acts by a human. For example, a human, or even thousands of humans, cannot efficiently, accurately and effectively manually apply countless thousands of candidate payloads to input points and perform analysis to identify software vulnerabilities or one or more defined condition as a function of determining that a probability value assigned to a candidate payload exceeds a defined probability value.

FIG. 1 illustrates a block diagram of an example, non-limiting system 100 that facilitates utilizing probabilistic modeling for root cause analysis in dynamic software testing in accordance with one or more embodiments described herein. Aspects of systems (e.g., non-limiting system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, non-limiting system 100 can be any type of mechanism, machine, device, facility, apparatus, and/or instrument that includes a processor and/or is capable of effective and/or operative communication with a wired and/or wireless network. Mechanisms, machines, apparatuses, devices, facilities, and/or instrumentalities that can comprise non-limiting system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated, non-limiting system 100 can include test engine 102, processor 104, memory 106 and/or storage 108. In some embodiments, one or more of the test engine 102, processor 104, memory 106 and/or storage 108 can be communicatively and/or electrically coupled to one another to perform one or more functions of system 100. In some embodiments, test engine 102 can receive as input 110 a population of one or more candidate payloads $[t_1, \ldots, t_n]$ and one or more input points (e.g., input points at which software requests data to be input from a user, component and/or another process) into the software under test.

In response to receiving the population of candidate payloads $[t_1, \ldots, t_n]$ and the one or more input points into the software under test, test engine 102 can initialize a probabilistic transition model by assigning probability values to transitions between each state (or, in some embodiments, one or more states) in a probabilistic transition model. As used herein, the term "probabilistic transition model" can be or include a stochastic model describing or associated with a sequence of possible events in which the transition probability of one or more events can depend on the state attained in a previous event, such as a Markov chain.

Test engine 102 can also set a threshold value to a first value, and the threshold value can be an iteration threshold value that represents an iteration of the probabilistic transition model in relation to the number of candidate payloads included in the population of candidate payloads $[t_1, \ldots, t_n]$. For instance, the threshold value can be set to a value of ten, in which case the probabilistic transition model can iterate ten times. As another example, the threshold value can be set to a value of seven, in which case the probabilistic transition model can iterate seven times.

Any number of threshold values are possible. In some embodiments, the number of the threshold values depends on the level of desired refinement for the model. For example, the more iterations that are performed, the better the model becomes at identifying payloads that are likely to uncover vulnerabilities. For example, if a model is run 100 times rather than 10 times, the model will typically become more accurate at uncovering vulnerabilities. As different payloads (some payloads having been synthesized by the system) will have been applied to input points into the software to uncover vulnerabilities, the likelihood that the model will uncover additional vulnerabilities can increase. For instance, if software generates a request to enter a date of birth as YYYY-MM-DD, incorrect information can be intentionally entered (e.g., the last two digits of year of birth can be entered in the "DD" entries instead of entering the four digits of the year of birth in the "YYYY" entries and enter "1234" in the "YYYY" entries). Accordingly, the input is an invalid input since no person living today could have been born in the year 1234. In another embodiment, one candidate payload may be the string "1234-56-78", another candidate payload can be "1945-13-02", another candidate payload can be "1945-12-32", and another candidate payload can be "1945-12-11". From the foregoing, we can construct a model in which 1945 has a highest probability assigned to it because it occurs thrice in our set of candidate payloads; 12 has a slightly lower probability than 1945 because it appears twice, and the remaining tokens only occur once and therefore have the lowest probabilities.

In some embodiments, test engine 102 can also set a probability value that can be used to determine the likelihood that a candidate payload will identify a vulnerability. For example, in cases in which the probability value is set to a value of 0.6, candidate payloads that have associated probability values less than 0.6 can be determined not to identify vulnerabilities. Test engine 102 can initialize the counter value to a value of zero, and the counter value can be increased by one with an iteration of the probabilistic transition model to enable the test engine 102 to determine whether the probabilistic transition model has iterated a sufficient number of times.

The test engine 102 can monitor the counter value to determine whether the counter value exceeds the threshold value and whether a probability value assigned by the probabilistic transition model to a candidate payload included in the received population of candidate payloads exceeds the defined probability value. In embodiments in which the test engine 102 determines that the counter value exceeds the threshold value and the probability value assigned by the probabilistic transition model to a candidate payload included in the received population of candidate payloads exceeds the defined probability value, the test engine 102 can determine whether a match exists between the candidate payload and the one or more input points by applying the candidate payload to the one or more input points. In some embodiments, application of the candidate payload to the one or more input points can be performed through use of a web browser. For example, in embodiments in which the candidate payload is applied to the one or more input points of a web browser and an error message is generated, a software vulnerability has been identified.

In some embodiments, based on the identification of the software security vulnerability, the test engine 102 can generate a report describing and/or identifying the detected vulnerability. The report can be generated as output 112 in some embodiments. Output 112 can be transmitted from system 100 to another remote location over a channel or network in some embodiments. The channel can be a wired channel or a wireless channel in various different embodiments.

In embodiments in which the test engine 102 identifies a software security vulnerability in response to application of the candidate payload to the one or more input points, the test engine 102 typically does not further iterate through the remaining candidate payloads in the population of candidate payloads $[t_1, \ldots, t_n]$. Thus, in these embodiments, the test engine 102, in response to application of candidate payload $t_i$ to the one or more input points, determines that candidate payload $t_i$ reveals a software security vulnerability or defined condition, test engine 102 can generate a report indicating the application of candidate payload $t_i$ to the input point revealed a software security vulnerability.

In accordance with one or more further embodiments, the test engine 102 can tokenize a candidate payload into one or more tokens representative of the candidate payload. For example, in response to determining, by test engine 102, that the counter value exceeds the threshold value; that the probability value assigned by the probabilistic transition model to the candidate payload included in the received population of candidate payloads exceeds the defined probability value; and that a match between the candidate payload and the input point does not exist upon applying the candidate payload to the input point, test engine 102 can tokenize the candidate payload into one or more tokens representative of the candidate payload. In some embodiments, test engine 102 can tokenize the candidate payload into one or more tokens representative of the candidate payload, as a function of a defined language specific grammar. As described herein, the term "language specific grammar" can be or include one or more rules governing the composition of clauses, phrases, and words in language. A language specific grammar, for example, indicates within a computer language, such as a script language or a programming language, what constitutes, for instance, a string (e.g., one or more on-blank characters), what constitutes a token (e.g., a first string that is delineated from a second string by one or more blank characters), the specific meanings of special characters (e.g., "<" or "/>"), and the like.

As noted above, test engine 102 can tokenize the candidate payload into one or more tokens representative of the candidate payload, as a function of a defined language specific grammar. For instance, a candidate payload (e.g., "<script alert(1)/>") can be tokenized into the following tokens (e.g., "<" "script" "alert" "(" "1" ")" "/>"), wherein "<" is a first token, "script" is a second token, "alert" is a third token, "(" is a fourth token, "1" is a fifth token, ")" is a sixth token, and "/>" is a seventh token. Further, test engine 102 can add the resulting one or more tokens into the probabilistic transition model as one or more states and can assign transition probabilities to the one or more states, and/or can update the transition probabilities assigned to existing tokens comprising the probabilistic transition model. For instance, in regard to the foregoing example candidate payload (e.g., "<script alert(1)/>") it can have been determined that the first token "<" is followed by the second token "script", which in turn can be followed by the third token "alert", followed by the fourth token "(", the fifth token "1", the sixth token ")", and the seventh token "/>".

These tokens can be added to the probabilistic transition model as one or more states, and based on previous states representing previous tokens included the probabilistic transition model, the probabilities assigned to the previous states adjusted, and the probabilities associated with new states can be assigned. For instance, in regard to the foregoing first token (e.g., "<") and the seventh token (e.g., "/>"), these tokens can occur with a high level of frequency in candidate payloads and as such can have already been included in the probabilistic transition model, in which case the probabilities assigned to the first token and the seventh token can be adjusted from a first probability (e.g., 0.97) to a second higher probability (e.g., 0.972). in some embodiments, the probability can be adjusted based on the number of times that a particular token has been previously identified. Thus, if the token has been previously identified on 100 occasions, for example, the probability can be adjusted upward, as this is a token that appears with a fair degree of regularity. By contrast, if the token has been previously identified on 5 occasions, for example, the probability can be adjusted downward or remain the same, as this is a token that does not appear with a fair degree of regularity. In regard to tokens that have not previous been included in the probabilistic transition model, the probabilities initially assigned to these tokens can be low, for example and without limitation, between 0.0 and 0.01.

In regard to the foregoing it should be appreciated that candidate payloads are typically strings that comprise tokens. The strings can be scripting/programming instructions (e.g., machine executable instructions) that can cause the scripting/programming language instructions to execute on processors associated with a target environment. The instructions when executed on the processors perform operations in the target environment. Thus, when a candidate payload is applied to input points in a software under test, with the aim of detecting vulnerabilities, such as software security vulnerabilities, should the application of the candidate payload to the input points identify a vulnerability in relation to the target environment, the vulnerability can be determined and remedied by amending the software to remove the vulnerability. For instance, in an embodiment, the software can be amended to omit receiving a candidate payload at a particular input point into the software. In a further embodiment, the software can be changed so that the input necessary to satisfy the input point takes a different form, such as requiring a password to enter the software to be more than eight alphanumeric characters and less than 16 alphanumeric characters.

As will also be appreciated, there can be countless numbers of possible token combinations and permutations; selected ones of these combinations and permutations of tokens can be associated with identifying vulnerabilities in the software under test, while other combinations and permutations of tokens will not reveal vulnerabilities in regard to the software being tested. The subject disclosure, which is directed, in accordance with various embodiments, to identifying combinations of viable tokens (e.g., synthesized payloads) that can uncover vulnerabilities in software being tested, combinations and permutations of tokens that do not reveal any vulnerabilities can be discounted and assigned low transition probabilities, whereas combinations and permutations of tokens that identify vulnerabilities in the software being tested can be accorded higher transition probabilities. For instance, combinations and permutation of tokens that do not reveal any vulnerabilities can be assigned probability values in the range of 0.0 to 0.20, while combinations and permutations of tokens that identify vulnerabilities can be assigned probability values in the range of 0.8 to 1.0.

Thus, test engine 102 can determine whether a candidate payload, when applied to input points in software that is being tested, detects a defined condition (e.g., software security vulnerability). For example, a candidate payload can be applied to a website through use of a web browser to determine whether or not the candidate payload generates a defined condition, such as a buffer overflow. Should the candidate payload, when applied to an input point, not uncover or result in identification of the defined condition (e.g., a buffer overflow), the tokens included in the token combination that comprises the candidate payload can be assigned relatively low transition probabilities. Conversely, should the candidate payload, when applied to an input point, result in identification of the defined condition (e.g., a buffer overflow) and uncover a software security vulnerability, the tokens that comprise the token combination that forms the candidate payload can be assigned high transition probabilities. The transition probabilities assigned respective tokens can be used to synthesize candidate payloads to uncover additional software security vulnerabilities, such as over-reads (e.g., a case in which a program, while reading data from a buffer, overruns the buffer boundary and reads (or tries to read) adjacent memory).

Synthesized candidate payloads are payloads that are synthesized using the probabilistic transition model. In some embodiments, tokens that have been assigned high transition probabilities can be used to form the synthesized candidate payloads. The tokens that have been assigned high transition probabilities, for instance, in the range of 0.5 to 1.0, can be selected for inclusion in synthesized candidate payloads, and the synthesized candidate payloads can be included in the population of candidate payloads. The rationale for synthesizing candidate payloads based on their respective transition probabilities is that tokens that have been assigned high transition probabilities in the probabilistic transition model will typically have a higher likelihood of uncovering further defined conditions in the software that is being tested than tokens that have been assigned lower transition probabilities in the probabilistic transition model.

It should further be noted that payloads (and the combination of tokens included in the payloads) can be context-sensitive. For instance, when applied to an input point in relation to a first software context, a payload can uncover many vulnerabilities, but when a similar or the same payload is applied to an input point in relation to a second software context, the payload may not uncover any vulnerabilities (or may uncover fewer vulnerabilities). For instance, in embodiments in which a payload is applied to an input point in the context of a shopping website, numerous vulnerabilities may be identified but in embodiments in which the same payload is applied to an input point in the context of a genealogical website, no vulnerabilities (or fewer vulnerabilities) may be identified.

Moreover, in cases in which the software context is the same, there can be variations at a sub-context level. This is particularly evident in cases in which a first software context (e.g., a first online social networking website or corresponding application) and a second software context (e.g., a second online social networking website or corresponding application) were developed using a common underlying framework, which over time and respective versions of the respective first software context and the second software context has led the high level context remain the same (since each was developed on a common underlying framework for a common purpose), but the lower level sub-contexts of each to have diverged due to the respective evolution of the first software context and the second software context.

As used herein, the terms "context" means an application, system or category and "sub-context" means a variant on the application, system or category. By way of example, but not limitation, UNIX is an operating system or context while variants of UNIX (e.g., AIX, BSD) could be considered sub-contexts of the UNIX context. As used herein, the sub-context can be a different variant of a context (which may operate slightly different from the context or another sub-context). In regard to context and sub-context, these aspects can be further understood by considering shopping websites that are initially developed for two different retailers. In this initial phase both websites are operationally the same and both websites use the same software modules and functions to obtain and process data from users who may use the respective websites. Accordingly, in the initial phase, the context in relation to the first retailer and the second retailer are the same. Nevertheless, overtime time, with modification to each respective website to accommodate growth of each retailer's business needs and requirements, the context of the respective websites can diverge so that each website operates in a slightly different manner than when initially developed. The sub-contexts of the different websites therefore will have changed and become variants of the originally developed shopping website, though the higher level context (the fact that they are respective shopping websites) will have remained the same.

Thus, in one or more example embodiments, test engine 102 can employ probabilistic modeling (e.g., probabilistic transition models) to determine, based on an application of candidate payloads to input points, that matches exists between candidate payloads and input points which result in defined conditions being identified. Therefore, performance of root cause analysis in dynamic software testing can be substantially improved. For example, by determining that probability values assigned to candidate payloads exceed defined probabilities values, the test engine 102 can reduce the population of candidate payloads to be analyzed such that the remaining candidate payloads are those that are more likely to result in a defined condition, software security vulnerability or deficiency.

To facilitate performing root cause analysis in dynamic software testing via probabilistic modeling, test engine 102 can initialize a threshold value, a defined probability value, and a counter value. Further, in response to determining that a probability value assigned to a candidate payload of one or more candidate payloads exceeds the defined probability value and determining that the counter value exceeds the threshold value, can further determine that a match exists between the candidate payload and an input point based on an application of the candidate payload to the input point resulting in a defined condition, wherein the one or more candidate payloads and input data are represented by population data accessed by test engine 102 and wherein the input data represents the input point (e.g., a point where software requests entry of input by a user).

Test engine 102 can also determine instances in which there is no match between the candidate payload and the input point. In these cases, test engine 102 can parse the candidate payload into one or more tokens representative of the candidate payload. Test engine 102 can also add the one or more tokens to a model, and update a probability associated with transitioning to a first token from a second token. Additionally, in some embodiments, in response to determining that the application of the candidate payload to the input point results in the defined condition, the test engine 102 can remove the candidate payload from the population data, thereby reducing the size of the population data and facilitating improved processing time and accuracy for reporting the defined condition. In regard to the foregoing, the model used by test engine 102 can be a stochastic model describing a sequence of events in which a probability assigned an event in the sequence of events is dependent on a state attained by a prior event in the sequence of events.

In some embodiments, test engine 102 can initialize the defined probability value, the counter value, and the threshold value, and perform a lexical scan on the candidate payload to extract one or more tokens representing the candidate payload. In some embodiments, the lexical scan can be performed by test engine 102 in response to a determination that a defined condition is not generated after applying the candidate payload to the input point.

Test engine 102 can also add the one or more tokens representing the candidate payload to a probabilistic transition model, and update one or more transition probabilities assigned to one or more existing tokens in the probabilistic transition model. The candidate payload can comprise one or more strings of alphanumeric characters, wherein one of the one or more strings comprises one or more tokens. The tokens can be defined by a language specific grammar.

Figure 2:
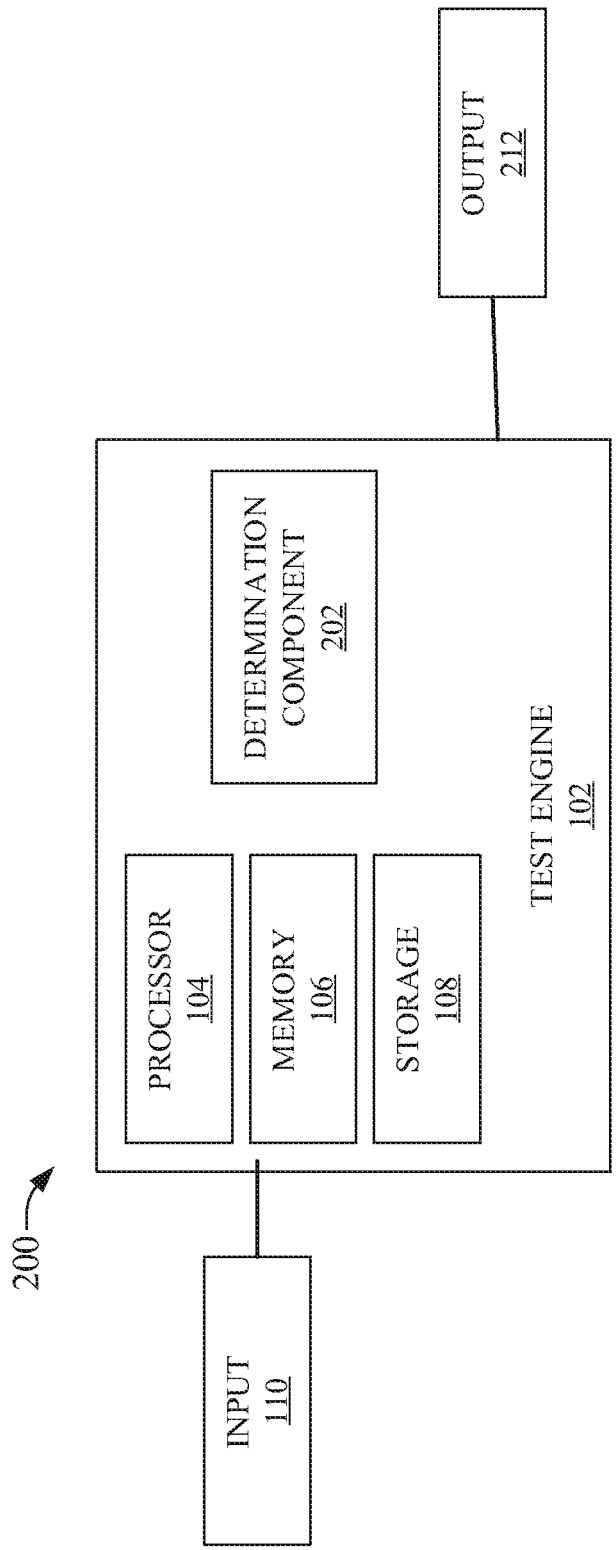
FIG. 2 illustrates another block diagram of an example, non-limiting system that facilitates performing root cause analysis in dynamic software testing via probabilistic modeling in accordance with one or more embodiments described herein.

FIG. 2 illustrates another block diagram of an example, non-limiting system that facilitates performing root cause analysis in dynamic software testing via probabilistic modeling in accordance with one or more embodiments. Repetitive description of like elements employed in other embodiments described herein is omitted for sake of brevity.

Non-limiting system 200 can include one or more of the components and/or functionality of system 100, and vice versa. As illustrated, test engine 102 of system 200 can include determination component 202 to determine whether a counter value exceeds a threshold value, and/or to determine whether a probability value assigned by a probabilistic transition model to a candidate payload included in a population of candidate payloads exceeds a defined probability value. Further, in some embodiments, determination component 202 can also determine whether a match exists between a candidate payload and an input point in software under test in response to the candidate payload being applied to the input point in order to identify defined conditions (e.g., software security vulnerabilities). Additionally, determination component 202 can also determine that a match does not exist between the candidate payload and the input point in the software under test. In this instance, in response to the candidate payload being applied to the input point, no vulnerabilities or defined conditions would be identified or output from the test engine 102.

Figure 3:
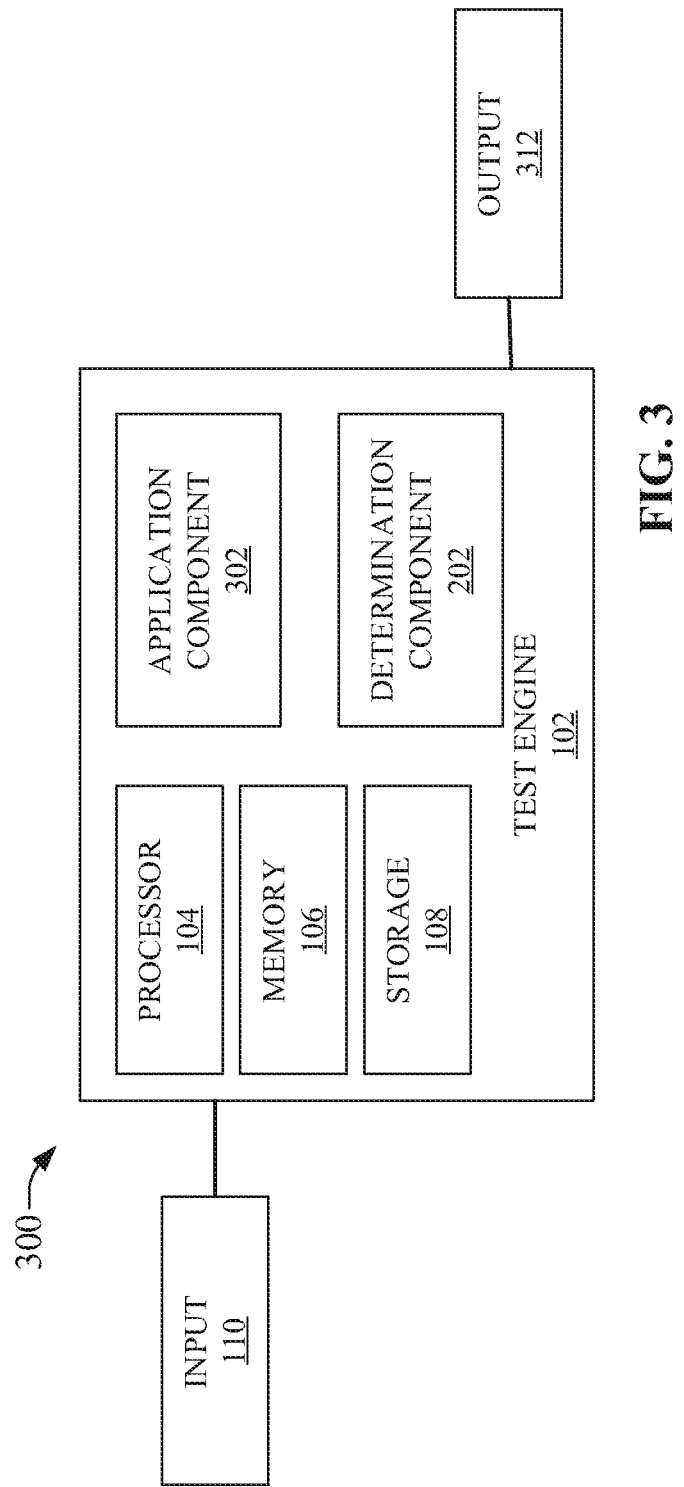
FIG. 3 illustrates another block diagram of an example, non-limiting system that facilitates performing root cause analysis in dynamic software testing via probabilistic modeling in accordance with one or more embodiments described herein.

FIG. 3 illustrates another block diagram of an example, non-limiting system that facilitates performing root cause analysis in dynamic software testing via probabilistic modeling in accordance with one or more embodiments. Repetitive description of like elements employed in other embodiments described herein is omitted for sake of brevity.

System 300 can include one or more of the components and/or functionality of systems 100, 200 and vice versa. As shown, test engine 102 of system 300 can include application component 302 and determination component 202, along with other components shown with reference to FIG. 1. Application component 302 can apply the candidate payload to an input point in software to enable the test engine 102 to determine whether the candidate payload detects vulnerabilities or defined conditions in the software. In some embodiments, application component 302 can apply the candidate payload at a web browser (or other input point, as dictated by test engine 102). Application component 302 can determine whether an error message related to a software vulnerability is identified as a result of applying the candidate payload to the input point.

Figure 4:
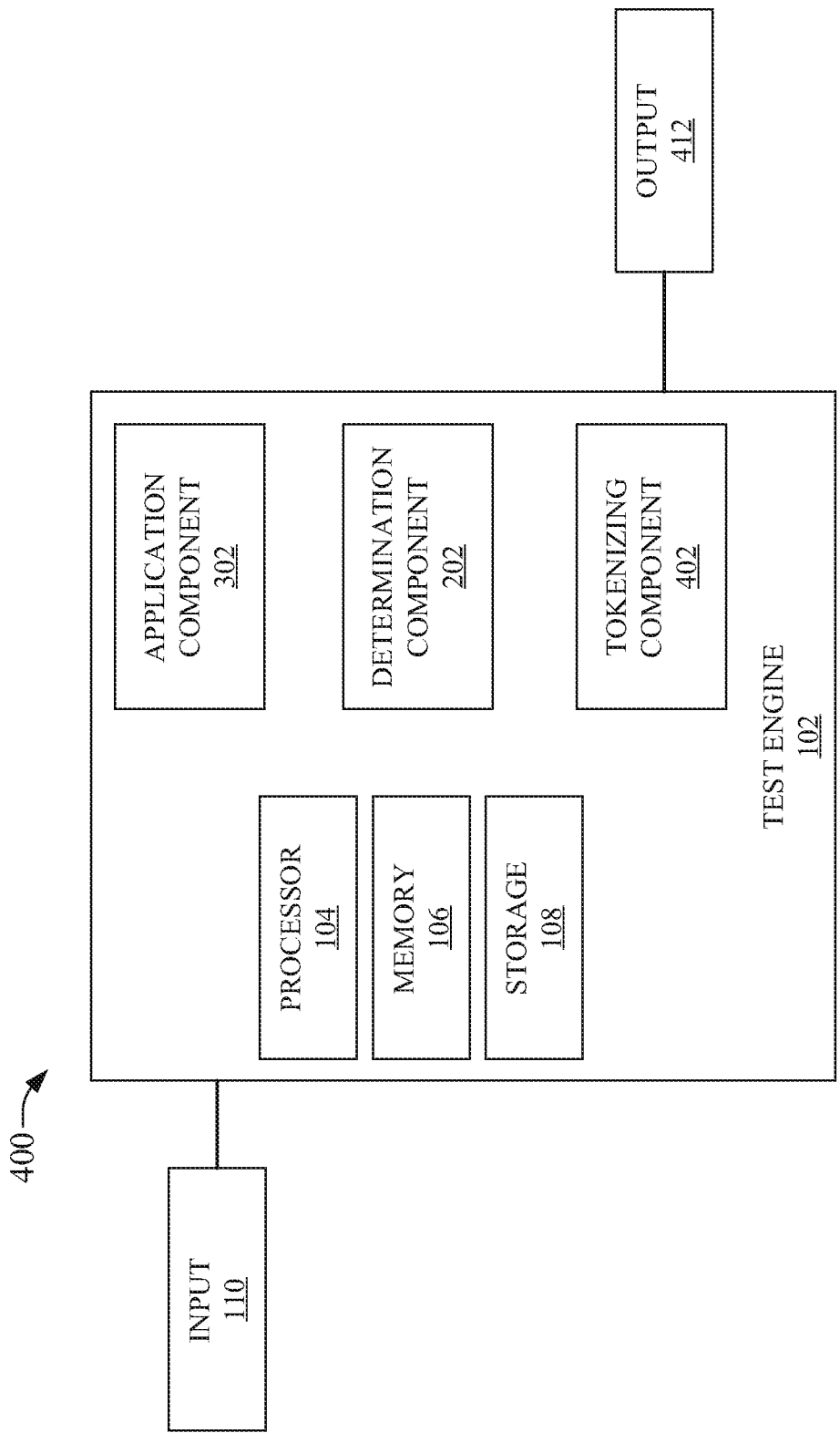
FIG. 4 illustrates another block diagram of an example, non-limiting system that facilitates performing root cause analysis in dynamic software testing via probabilistic modeling in accordance with one or more embodiments described herein.

Turning now to FIG. 4, illustrated is another block diagram of an example, non-limiting system that facilitates performing root cause analysis in dynamic software testing via probabilistic modeling. Repetitive description of like elements employed in other embodiments described herein is omitted for sake of brevity.

System 400 can include one or more of the components and/or functionality of systems 100, 200, 300 and vice versa. As shown, test engine 102 of system 400 can include tokenizing component 402, application component 302 and determination component 202, along with other components shown with reference to FIG. 1.

Tokenizing component 402 can tokenize candidate payloads as a function of a defined language specific grammar (e.g., a set of structural rules governing the composition of clauses, phrases, and words in a language). As has been noted above, candidate payloads can comprise one or more strings, and a string can comprise one or more tokens. Tokenizing component 402 can parse the stream of characters that comprise the strings to identify the one or more tokens that form the one or more strings. The parsing can be performed in response to receiving a candidate payload comprising one or more strings, and as a function of a defined language grammar. In response to identifying the one or more tokens that form the one or more strings, tokenizing component 402 can assign transition probabilities in the range of 0.0 to 1.0 to each (or, in some embodiments, one or more) of the identified tokens. The transition probabilities assigned by tokenizing component 402 can represent probabilities associated with transitioning or moving between tokens. For example, a first transition probability can be probability associated with having a first particular token and then having a second particular token following the first particular token. A second transition probability can be a probability associated with having a first particular token and then having a third particular token.

In some embodiments, system 400 can synthesize additional candidate payloads comprising high value tokens (e.g., tokens that have been assigned or are associated with high transition probabilities) for further testing with regard to input points in software being tested for defined conditions or software vulnerabilities. The candidate payloads synthesized can be selected based on the transition probabilities associated with tokens. For instance as described above in regard to the first token (e.g., "<") and the seventh token (e.g., "/>"), since these tokens can occur with a high level of frequency in candidate payloads and accordingly can have high probability values, these tokens can be included in a synthesized candidate payload. The benefit of synthesizing candidate payloads to include tokens with high probabilities is that such payloads will typically provide a higher likelihood that the test engine 102 will identify a vulnerability.

Figure 5:
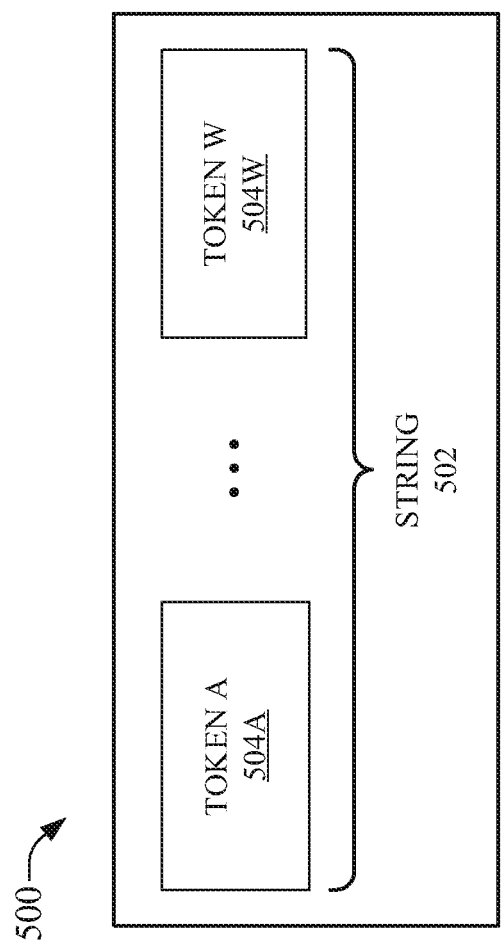
FIG. 5 illustrates an example candidate payload that facilitates performing root cause analysis in dynamic software testing via probabilistic modeling in accordance with one or more embodiments described herein.

FIG. 5 illustrates an example candidate payload that facilitates performing root cause analysis in dynamic software testing via probabilistic modeling in accordance with one or more embodiments. Repetitive description of like elements employed in other embodiments described herein is omitted for the sake of brevity.

Candidate payload 500, as illustrated in FIG. 5, includes a string 502 comprising one or more tokens represented in FIG. 5 as TOKEN A 504A, . . . , TOKEN W 504W. In an example, candidate payload can comprise the string "<script alert(1)/>", as illustrated and described in greater detail with reference to FIG. 6A.

Figure 6A:
FIGS. 6A and 6B illustrate components of another example candidate payload that facilitates performing root cause analysis in dynamic software testing via probabilistic modeling in accordance with one or more embodiments described herein.
Figure 6B:
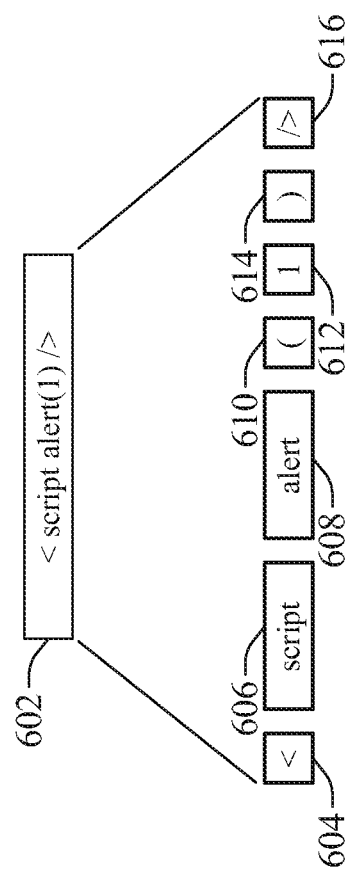

FIGS. 6A and 6B illustrate components of another example candidate payload that facilitates performing root cause analysis in dynamic software testing via probabilistic modeling in accordance with one or more embodiments. Repetitive description of like elements employed in other embodiments described herein is omitted for the sake of brevity.

Candidate payload 600 includes a string 602: "<script alert(1)/>". String 602 can be comprised of a sequence of characters. In response to applying a language specific grammar to the sequence of characters and parsing the sequence of characters, a group of tokens can be extracted, as shown in FIG. 6B. The tokens that comprise string 602 (e.g., "<script alert(1)/>"), in this instance, are illustrated as token 604, token 606, token 608, token 610, token 612, token 614, and token 616 (e.g., "<", "script", "alert", "(", "1", ")", and "/>").

Each (or, in some embodiments, one or more) of the tokens (e.g., token 604, token 606, token 608, token 610, token 612, token 614, and token 616) can be added to the probabilistic transition model and a transition probability value in the range of 0.0 to 1.0 can be assigned, for instance, to a transition from first token 604 to a second token 606. In a further example, a further transition probability value in the range of 0.0 to 1.0 can be assigned to a transition from the second token 606 to a third token 608. Additionally, in a further example, another transition probability value in the range of 0.0 to 1.0 can be assigned to a transition from the third token 608 to the fourth token 610. In a further example, an additional transition probability value in the range of 0.0 to 1.0 can be assigned to a transition from the second token 606 to the third token 608.

In yet another example, transition probability values in the range of 0.0 to 1.0 can be assigned and represent the likelihood of not transitioning from one particular token to another particular token. For example, a transition probability value in the range of 0.0 to 1.0 can be assigned to the likelihood of not transitioning from the first token 604 to the second token 606, but remaining at the first token 604. Similarly, transition probability values in the range of 0.0 to 1.0 can be assigned to the likelihood of not transitioning from the second token 606 to the third token 608 (e.g., remaining a the second token 606). The probabilistic transition model, together with the tokens and their associated transition probability values can provide a useful abstraction that allows global reasoning across multiple disparate payloads. In this regard, the probabilistic transition model can allow system 400 to synthesize candidate payloads based on the developed (and/or developing/evolving) probabilistic transition model, the tokens included in the probabilistic transition model, and the transition probabilities assigned to each (or, in some embodiments, one or more) of the tokens included in the probabilistic transition model. The probabilistic model can also allow testing of these synthesized candidate payloads in relation to input points for a software under test to determine vulnerabilities in regard to the software and to identify matches between the synthesized candidate payloads and the input points into the software under test.

Figure 7:
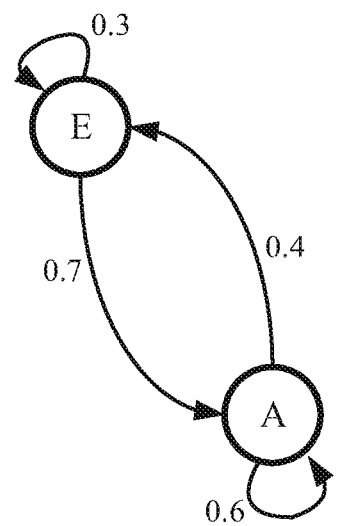
FIG. 7 illustrates an example probabilistic transition model that facilitates performing root cause analysis in dynamic software testing via probabilistic modeling in accordance with one or more embodiments described herein.

FIG. 7 illustrates an example probabilistic transition model that facilitates performing root cause analysis in dynamic software testing via probabilistic modeling in accordance with one or more embodiments. Repetitive description of like elements employed in other embodiments described herein is omitted for sake of brevity.

As illustrated, probabilistic transition model 700 comprises two tokens: token A and token E. Although two tokens are shown in FIG. 7, in other embodiments, any number of different tokens and corresponding transition probabilities can be included. As illustrated, token A has been associated with a transition probability value of 0.4 to transition from token A to token E, and a transition probability value of 0.6 to remain at token A. Token E, as depicted, has also been associated with transition probability values, wherein the probability value associated with transitioning from token E to token A is 0.7, and the probability value associated with remaining at token E is 0.3. As will be appreciated by those of ordinary skill, token A can represent an example first state and token E can represent an example second state in the probabilistic transition model 700. The above transition probability values are mere examples and can vary in other embodiments. All such embodiments are envisaged.

Figure 8:
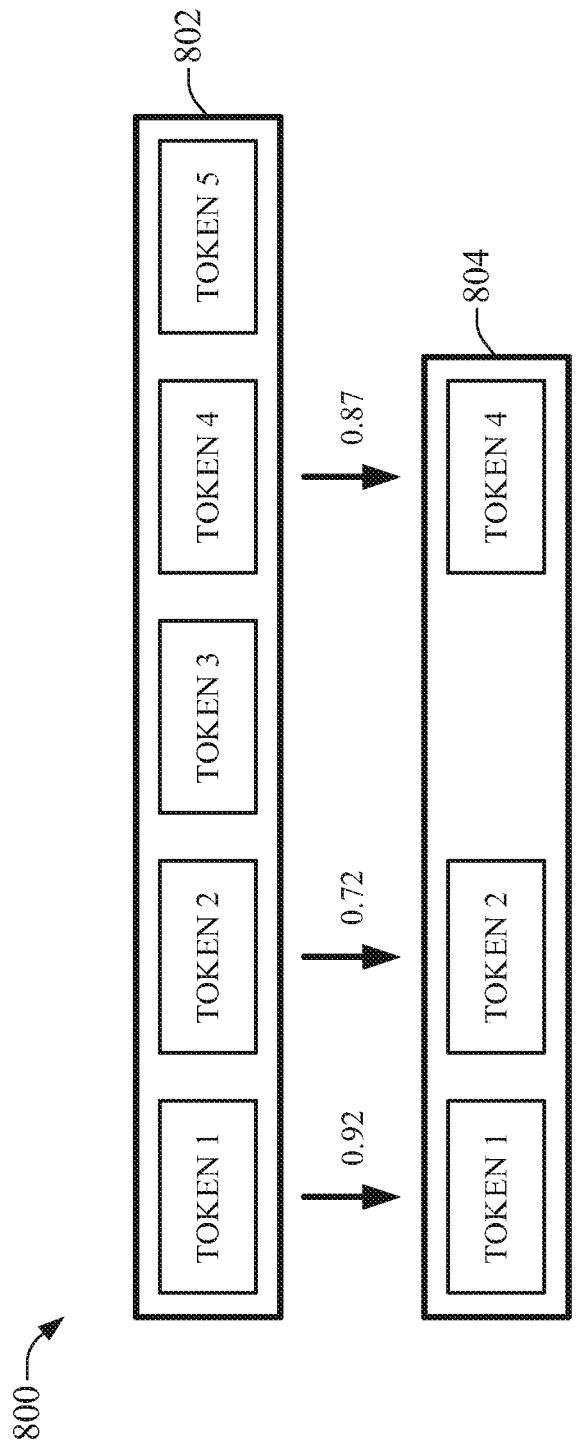
FIG. 8 illustrates an example candidate payload and an example synthesized payload that facilitates performing root cause analysis in dynamic software testing via probabilistic modeling in accordance with one or more embodiments described herein.

FIG. 8 illustrates an example candidate payload and an example synthesized payload that facilitates performing root cause analysis in dynamic software testing via probabilistic modeling in accordance with one or more embodiments. Repetitive description of like elements employed in other embodiments described herein is omitted for sake of brevity.

Synthesis 800 illustrates a synthesized candidate payload 804 derived from one or more earlier tested candidate payloads, such as candidate payload 802. In this instance, the earlier candidate payload 802 included five distinct tokens (e.g., token 1, token 2, token 3, token 4, and token 5). As a function of a developed and/or a continually developing/evolving probabilistic transition model and transition probability values associated with the five distinct tokens, system 400 determined that token 1, token 2, and token 4, with respective transition probability values of 0.92, 0.72, and 0.87, are the most suitable candidate tokens to be included as a string in the synthesized candidate payload 804. The synthesized candidate payload 804 can then be supplied in a population of candidate payloads $[t_1, \ldots, t_n]$ together with an input point for processing in the manner outlined above with regard to non-limiting system 400.

Some of the foregoing processes performed may be performed by specialized computers for carrying out defined tasks related to the performance of root cause analysis in dynamic software testing via probabilistic modeling. The subject computer processing systems, methods, apparatuses and/or computer program products can be employed to solve new problems that arise through advancements in technology, computer networks, the Internet and the like. The subject computer processing systems, methods, apparatuses and/or computer program products can provide technical improvements to automated performance of root cause analysis in dynamic software testing via probabilistic modeling by improving processing efficiency among processing components in root cause analysis in dynamic software testing systems, reducing delay in processing performed by the processing components, and improving the accuracy in which the processing systems perform root cause analysis in dynamic software testing via probabilistic modeling.

Figure 9:
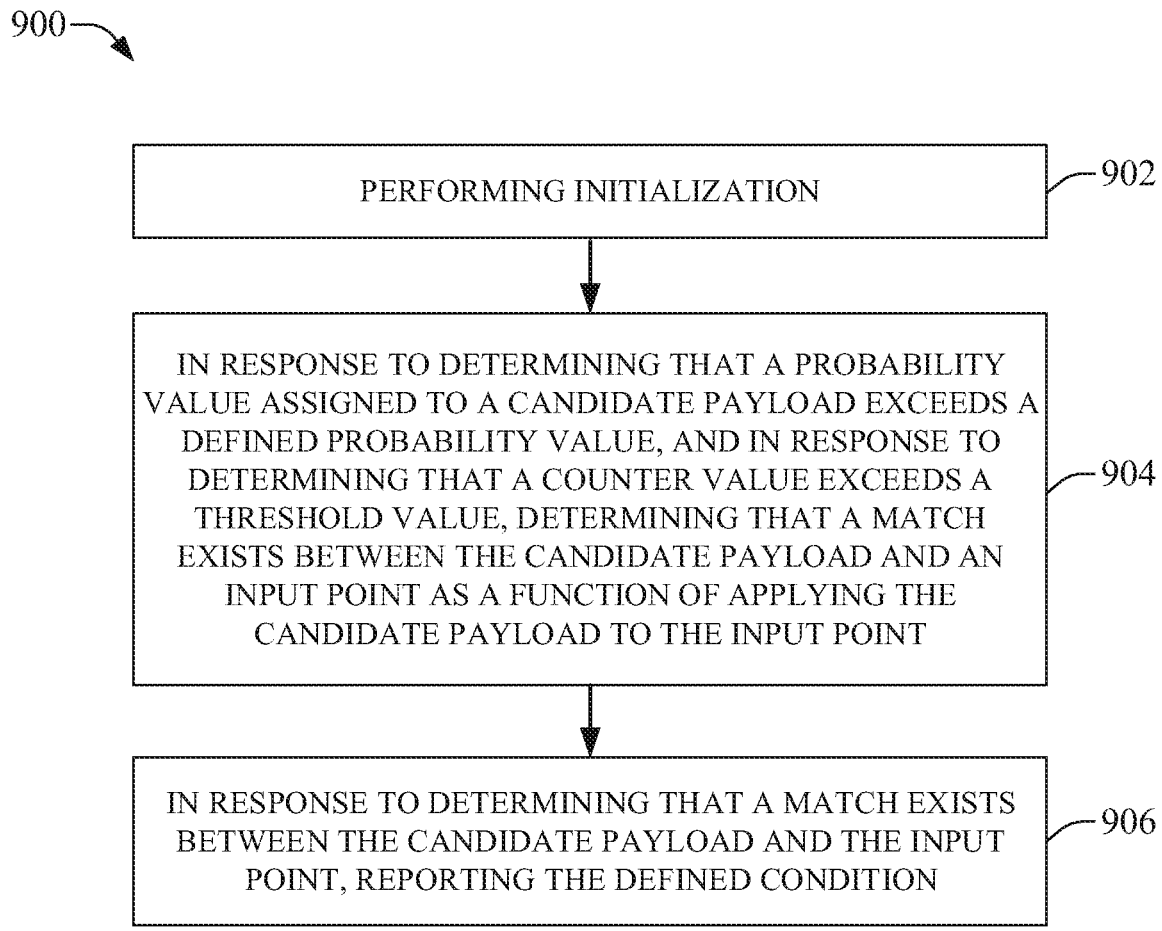
FIG. 9 illustrates a flow diagram of an example, non-limiting computer-implemented method that facilitates performing root cause analysis in dynamic software testing via probabilistic modeling in accordance with one or more embodiments described herein.

FIG. 9 illustrates a flow diagram of an example, non-limiting computer-implemented method 900 that facilitates utilizing probabilistic modeling for root cause analysis in dynamic software testing in accordance with one or more embodiments described herein. Repetitive description of like elements employed in other embodiments described herein is omitted for sake of brevity.

At 902, a system operatively coupled to a processor (e.g., test engine 102) can perform initialization. For example, a threshold value, a defined probability value and a counter value can be initialized. The initialization of the threshold value, the defined probability value, and the counter value can be performed, for instance, by test engine 102.

At 904, the system, in response to determining that a probability value assigned to a candidate payload exceeds a defined probability value, and in response to determining that a counter value exceeds a threshold value, determining that a match exists between the candidate payload and an input point as a function of applying the candidate payload to the input point. The determinations in relation to whether or not the counter value exceeds a threshold value and the transition probability value assigned to a candidate payload exceeds the defined probably value, and whether a match exists between the candidate payload and an input into software under test can be performed by determination component 202 of test engine 102 in some embodiments. The application of the candidate payload to the input point in software under test to yield a defined condition can be performed by application component 302 of the test engine 102 in some embodiments. At 906, the system, in response to determining that a match exists between the candidate payload and the input point, can report the defined condition. Reporting the defined condition in the software under test can be performed by test engine 102.

Figure 10:
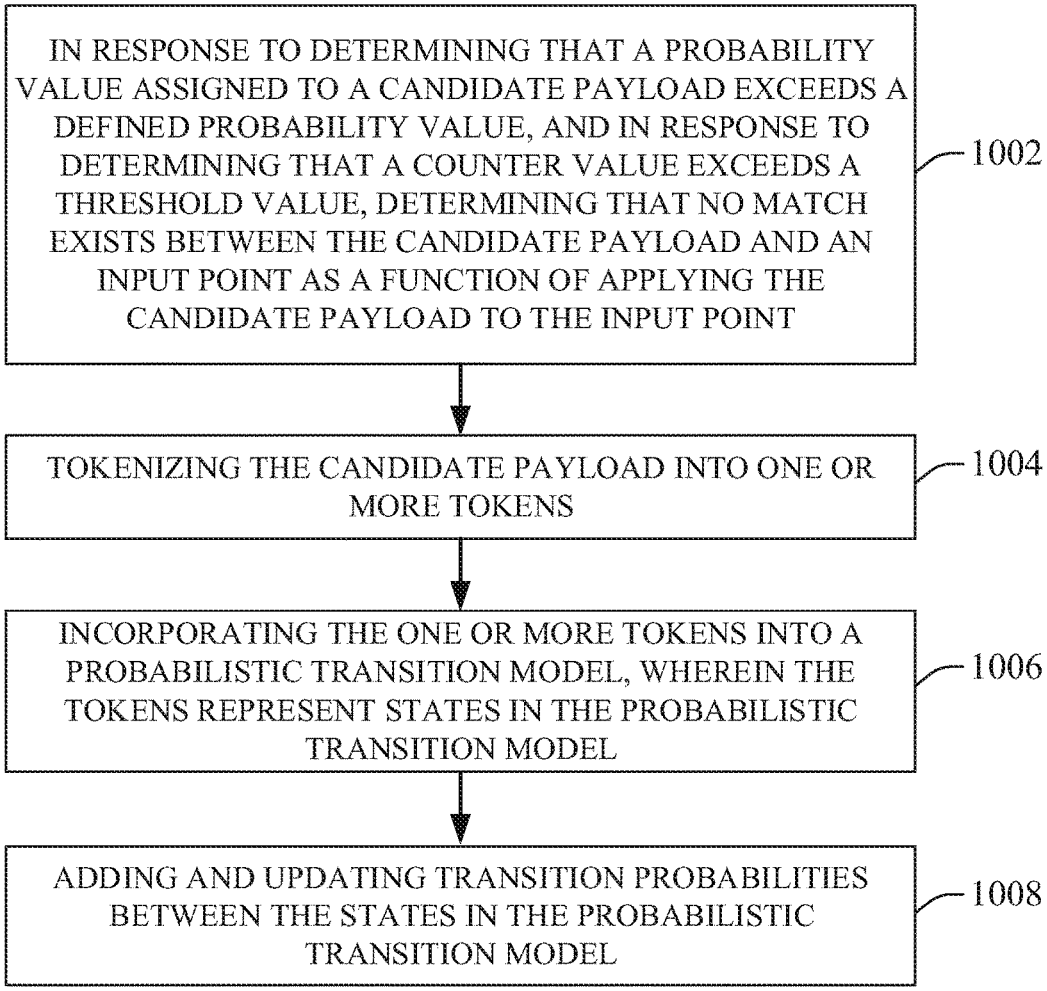
FIG. 10 illustrates a flow diagram of another example, non-limiting computer-implemented method that facilitates performing root cause analysis in dynamic software testing via probabilistic modeling in accordance with one or more embodiments described herein.

FIG. 10 illustrates a flow diagram of another example, non-limiting computer-implemented method 1000 that can facilitate utilizing probabilistic modeling for root cause analysis in dynamic software testing in accordance with one or more embodiments described herein. Repetitive description of like elements employed in other embodiments described herein is omitted for sake of brevity.

At 1002, in response to determining that a probability value assigned to a candidate payload exceeds a defined probability value, and in response to determining that a counter value exceeds a threshold value, a system can determine that no match exists between the candidate payload and an input point as a function of applying the candidate payload to the input point. For example, in response to determining that a counter value exceeds a threshold value and a transition probability value assigned to a candidate payload in a group of candidate payloads exceeds a defined probably value, a determination component 202 of test engine 102 can determine that a match does not exists between the candidate payload and an input point into software under test. Application of the candidate payload to the input point in the software under test can be performed by application component 302 of the test engine 102.

At 1004, tokenizing the candidate payload into one or more tokens can be performed (e.g., by tokenizing component 402). Further, at 1006 incorporating the one or more tokens into a probabilistic transition model, wherein the tokens represent states in the probabilistic transition model, can also be performed (e.g., by tokenizing component 402). Additionally, at 1008, adding and updating transition probabilities between the states in the probabilistic transition model can be performed (e.g., by tokenizing component 402).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 11:
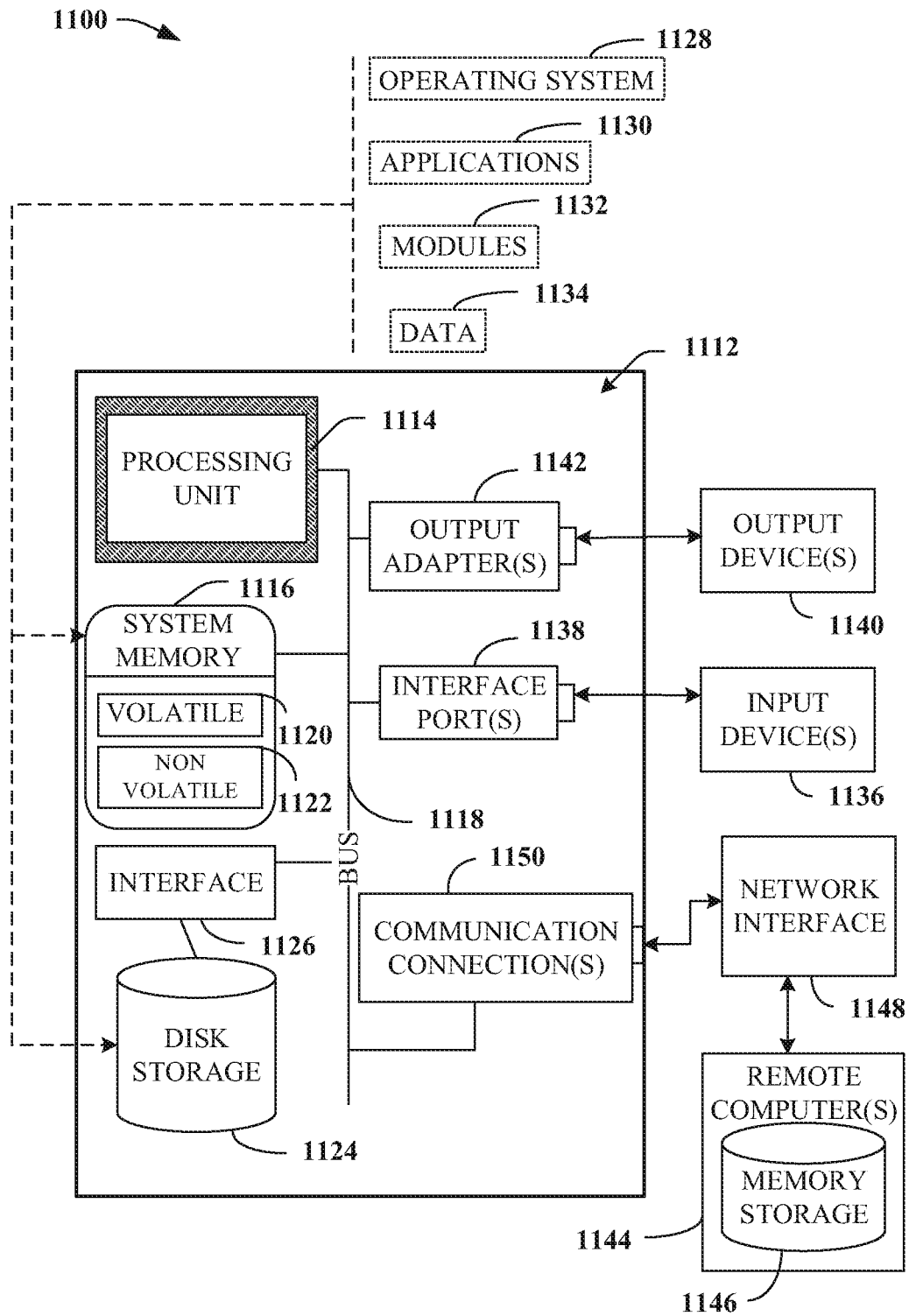
FIG. 11 illustrates a block diagram of an example, non-limiting operating environment in which one or more embodiments described herein can be facilitated.

In order to provide a context for the various aspects of the disclosed subject matter, FIG. 11 as well as the following discussion are intended to provide a general description of a suitable environment in which the various aspects of the disclosed subject matter can be implemented.

FIG. 11 illustrates a block diagram of an example, non-limiting operating environment in which one or more embodiments described herein can be facilitated. Repetitive description of like elements employed in other embodiments described herein is omitted for sake of brevity. With reference to FIG. 11, a suitable operating environment 1101 for implementing various aspects of this disclosure can also include a computer 1112. The computer 1112 can also include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1116 can also include volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1101. Such software can also include, for example, an operating system 1128. Operating system 1128, which can be stored on disk storage 1124, acts to control and allocate resources of the computer 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and number-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transition word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
setting, by a system operatively coupled to a processor, a threshold value, a defined probability value, and a counter value, wherein counter value is less than the threshold value;
in response to determining, by the system, that a probability value assigned to a candidate payload of a set of candidate payloads exceeds the defined probability value and that the counter value exceeds the threshold value after at least one iteration of a probabilistic transition model, where the counter value is incremented at each iteration of the at least one iteration the probabilistic transition model:
determining, by the system, that a match exists between the candidate payload and an input point of a software under test, and
in response to determining, by the system, that application of the candidate payload to the input point results in a defined condition, removing the candidate payload from population data, thereby reducing a size of the population data and facilitating improved processing time and accuracy for reporting the defined condition.

2. The computer-implemented method of claim 1, further comprising:
adding, by the system, the one or more tokens to the probabilistic transition model determined by the system.

3. The computer-implemented method of claim 2, wherein one of the one or more tokens is a first token, the computer-implemented method further comprising:
updating, by the system, a probability associated with transitioning to the first token from a second token of the one or more tokens.

4. The computer-implemented method of claim 2, wherein the probabilistic transition model is a stochastic model describing a sequence of events in which a probability assigned an event in the sequence of events is dependent on a state attained by a prior event in the sequence of events.

5. The computer-implemented method of claim 1, wherein the setting further comprises setting, by the system, the counter value to zero.

6. The computer-implemented method of claim 1, wherein the setting further comprises assigning, by the system, a probability to the defined probability value, wherein the assigned probability is in a range from zero to one.

7. The computer-implemented method of claim 1, wherein the candidate payload comprises one or more strings.

8. A non-transitory computer program product for performing root cause analysis in dynamic software testing, the computer program product comprising a computer readable storage medium having program instructions embodied therewith, the program instructions executable by a processing component to cause the processing component to:
set a threshold value, a defined probability value, and a counter value, wherein counter value is less than the threshold value;
in response to determining that a probability value assigned to a candidate payload of a set of candidate payloads exceeds the defined probability value, and that the counter value exceeds the threshold value after at least one iteration of a probabilistic transition model, where the counter value is incremented at each iteration of the at least one iteration the probabilistic transition model:
determine that a match exists between the candidate payload and an input point of a software under test, and
in response to determining that application of the candidate payload to the input point results in a defined condition, remove the candidate payload from population data, thereby reducing a size of the population data and facilitating improved processing time and accuracy for reporting the defined condition.

9. The non-transitory computer program product of claim 8, wherein the program instructions are further executable by the processing component to cause the processing component to add the one or more tokens to the probabilistic transition model determined by the system.

10. The non-transitory computer program product of claim 9, wherein one of the one or more tokens is a first token, and the program instructions are further executable by the processing component to cause the processing component to update a probability associated with transitioning to the first token from a second token of the one or more tokens.

11. The non-transitory computer program product of claim 9, wherein the probabilistic transition model is a stochastic model describing a sequence of events in which a probability assigned an event in the sequence of events is dependent on a state attained by a prior event in the sequence of events.

12. The non-transitory computer program product of claim 8, wherein the program instructions are further executable by the processing component to cause the processing component to set the counter value to zero.

13. The non-transitory computer program product of claim 8, wherein the program instructions are further executable by the processing component to assign a probability to the defined probability value, wherein the assigned probability is in a range from zero to one.

14. The non-transitory computer program product of claim 8, wherein the candidate payload comprises one or more strings.

15. A system, comprising:
a processor; and
a memory communicatively coupled to the processor, the memory having stored therein computer-executable instructions, comprising:
a test engine configured to:
set a threshold value, a defined probability value, and a counter value, wherein counter value is less than the threshold value;
in response to determining that a probability value assigned to a candidate payload of a set of candidate payloads exceeds the defined probability value, and that the counter value exceeds the threshold value after at least one iteration of a probabilistic transition model, where the counter value is incremented at each iteration of the at least one iteration the probabilistic transition model:
determine that a match exists between the candidate payload and an input point of a software under test, and
in response to determining that application of the candidate payload to the input point results in a defined condition, remove the candidate payload from population data, thereby reducing a size of the population data and facilitating improved processing time and accuracy for reporting the defined condition.

16. The system of claim 15, wherein the test engine is further configured to add the one or more tokens to the probabilistic transition model determined by the system.

17. The system of claim 16, wherein one of the one or more tokens is a first token, and the test engine is further configured to update a probability associated with transitioning to the first token from a second token of the one or more tokens.

18. The system of claim 16, wherein the probabilistic transition model is a stochastic model describing a sequence of events in which a probability assigned an event in the sequence of events is dependent on a state attained by a prior event in the sequence of events.

19. The system of claim 15, wherein the test engine is further configured to set the counter value to zero.

20. The system of claim 15, wherein the test engine is further configured to assign a probability to the defined probability value, wherein the assigned probability is in a range from zero to one.

* * * * *